United States Patent [19]

Palinchak

[11] Patent Number: 4,842,024
[45] Date of Patent: Jun. 27, 1989

[54] COMPOSITE HOSE FOR CONVEYING REFRIGERANT FLUIDS IN AUTOMOTIVE AIR-CONDITIONED SYSTEMS

[75] Inventor: Stephen Palinchak, Bucyrus, Ohio

[73] Assignee: Harvard Industries, Inc., St. Louis, Mo.

[21] Appl. No.: 76,013

[22] Filed: Jul. 21, 1987

[51] Int. Cl.$^4$ .............................................. F16L 11/08
[52] U.S. Cl. ................................... 138/125; 138/109; 138/126; 138/137; 285/149
[58] Field of Search .............. 138/109, 124, 125, 126, 138/137, 140, 141; 428/36; 285/149

[56] References Cited

U.S. PATENT DOCUMENTS

| | | | |
|---|---|---|---|
| 2,564,602 | 8/1951 | Hurst | 138/137 X |
| 2,800,145 | 7/1957 | Peierls et al. | 138/137 X |
| 2,899,982 | 8/1959 | Harpfer | 138/137 X |
| 4,091,843 | 5/1978 | Mikes et al. | 138/125 X |
| 4,209,042 | 6/1980 | Buan | 138/125 X |
| 4,330,017 | 5/1982 | Satoh et al. | 138/141 X |
| 4,617,213 | 10/1986 | Asano et al. | 138/126 X |
| 4,633,912 | 1/1987 | Pilkington et al. | 138/153 X |
| 4,657,285 | 4/1987 | Akiyama et al. | 138/137 X |
| 4,762,589 | 8/1988 | Akiyama et al. | |

FOREIGN PATENT DOCUMENTS 60-113885 6/1985 Japan.

Primary Examiner—James E. Bryant, III
Attorney, Agent, or Firm—Oblon, Fisher, Spivak, McClelland & Maier

[57] ABSTRACT

A composite hose for use in automotive air conditioning systems employing "Refrigerant 12" (dichlorodifluoromethane) including an innermost three-ply tube having an elastomer inner tube ply, a middle tube ply of a thermoplastic polymer bonded to the inner tube ply, and an outer tube ply of an elastomer bonded to the middle tube ply. At least one textile yarn, cord or fabric reinforcement layer surrounds the three-ply tube and a specially compounded elastomer cover overlies the textile reinforcement. Suitable adhesives maybe applied between the inner and middle tube and between the middle and outer tube to provide a consolidated, co-acting tube element. A hose fitting is attached to an end of the composite hose to form a hose assembly.

17 Claims, 2 Drawing Sheets

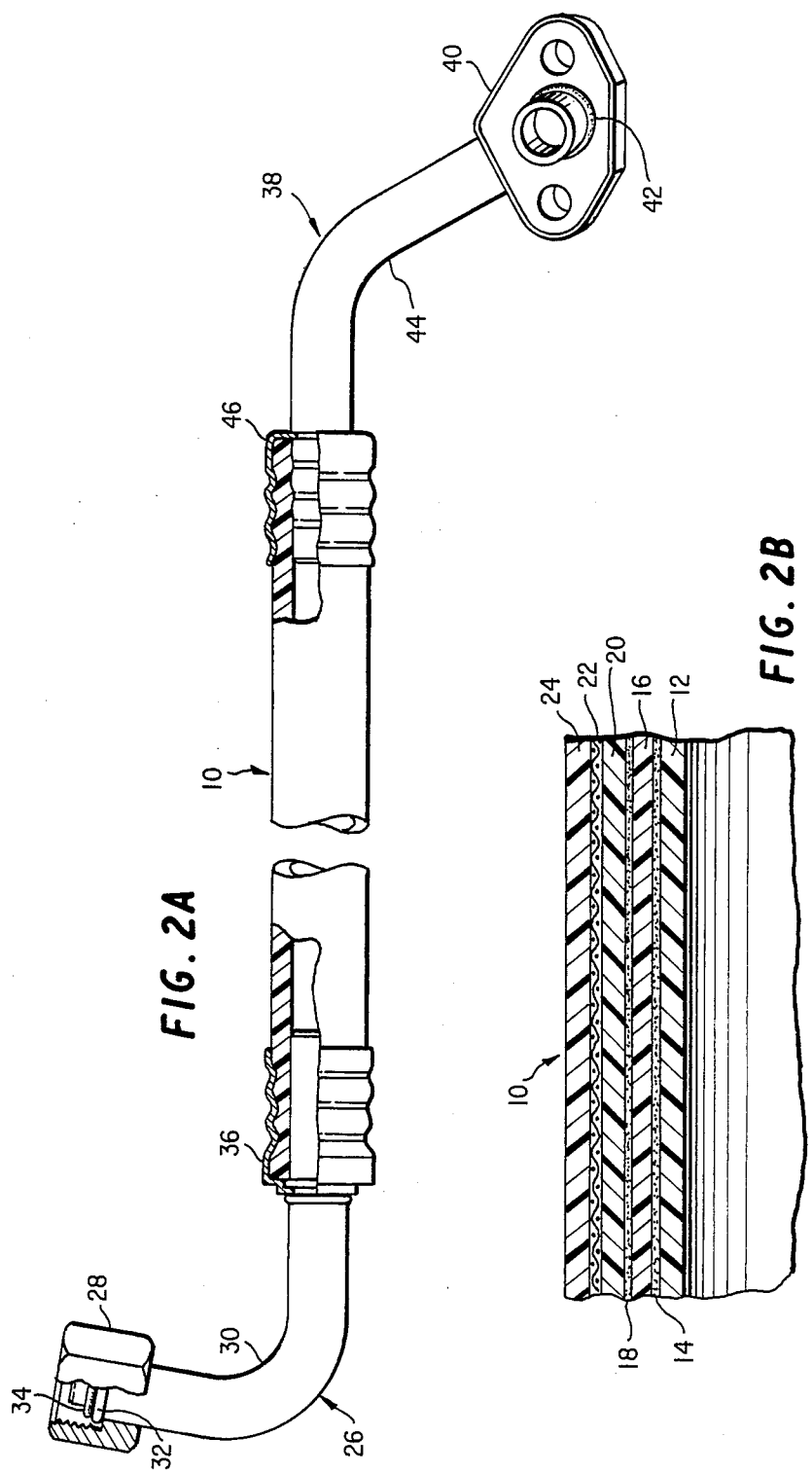

COMPOSITE HOSE FOR CONVEYING REFRIGERANT FLUIDS IN AUTOMOTIVE AIR-CONDITIONED SYSTEMS

CROSS-REFERENCE TO RELATED APPLICATIONS

This application is related to Applicant's related abandoned application Ser. No. 366,295 filed Apr. 6, 1982.

BACKGROUND OF THE INVENTION

1. Field of the Invention

This invention relates to a hose for an automotive air-conditioning system, and more particularly to a composite hose for conveying fluorocarbon-based refrigerent fluids, particularly dichlorodifluoromethane sold under the technical designation "Refrigerant 12", in the liquid or gaseous state. Also, this invention relates to a hose assembly using the hose of the invention.

Additionally, this invention refers to a hose for an automotive air-conditioning system, having three basic elements; first, an innermost element, known as the tube, sometimes referred to as a lining; secondly, an intermediate element, known as a reinforcement and thirdly an outermost element, known as a cover, sometimes referred to as a jacket.

2. Discussion of Background

Conventional automotive air conditioning system hoses, particularly those for use in conveying "Refrigerant 12" consist of either (1) an elastomeric compound tube, a reinforcement ply or plies and an elastomeric compound cover, or (2) a thermoplastic polymer tube, a reinforcement ply or plies and either a thermoplastic polymer or an elastomeric compound cover.

For example, U.S. Pat. No. 3,805,848 to Chrow discloses a two ply tube with an intermediate adhesive without specifically designating it as such. The inner ply (core tube) is polyamide and the outer ply (coating) is vinylidene chloride polymer, both thermoplastics. The two plies reportedly provide for the resistance to permeation of "Refrigerant 12" and the ingression of water vapor, but they result in a fairly stiff hose which is not easily intimately joined to a hose fitting to form a functioning hose assembly.

With the growing experience in automotive air conditioning system usage, some attributes of the presently available hoses have been identified by users as in need of improvement. First the ability of the wall of hose to resist the passage of pressurized "Refrigerant 12" from the air conditioning system to the atmosphere, normally called the permeability (quantified as permeation rate or effusion rate). The elastomeric compound types have evolved to the point where a marginally acceptable permeation rate exists, but only with compounds of a few select elastomers. Also it has been determined that extraordinarily heavy thicknesses must be used, particularly for the tube in immediate contact with the "Refrigerant 12", to achieve the marginally acceptable permeation rate. The resultant weight of the product is counter-productive and conflicts with the need to reduce vehicle weights to enable meeting mandated fuel economy standards. The permeation rate of the hoses utilizing a thermoplastic polymer tube, particularly when the thermoplastic material is selected from a number of suitable polyamides (commonly known as nylon) is many times less than that found for the elastomeric compound type. The thermoplastic polymer tube type is also much lighter in weight, but there are other features that make it less than ideal to satisfy the automotive industry needs. Characteristics commonly cited as reasons for not using the thermoplastic polymer tube type as a total replacement for the elastomeric compound tube type are:

1. Thermoplasticity, particularly at the elevated temperatures encountered in underhood areas of present day vehicles and in contemplated future designs, results in diminished capability to maintain acceptable hose-to-hose fitting performance at system pressures.

2. Transmission of refrigerant compressor noise into the passenger compartment is more noticeable and can become objectionable.

3. The inherent stiffness of the thermoplastic polymer hose decreases its utility in efficient routing in the now crowded engine compartments of vehicles.

Another condition encountered in automotive air conditioning systems that has recently been highlighted as a problem, is the occurrence of water vapor ingression through the hose wall from the atmosphere into the "Refrigerant 12" in the system. The presence of the condensed water vapor in the system causes corrosion in some components, reduces thermal efficiency and in some cases has reportedly initiated unwanted chemical reactions that in some way intensify the corrosion and further deteriorate the thermal efficiency.

The prior efforts to improving automotive air conditioning system hoses have not been successful at solving each of the shortcomings of conventional air-conditioning hoses, and thus have resulted in a less than ideal hose.

U.S. Pat. No. 2,899,982 by Harpfer discloses a three-ply layer in the construction of a hydraulic brake hose. This three-ply layer is an intermediate element and is described as being provided for the purpose of increasing resistance to length-wise stress. The three plies of this intermediate element are made up of longitudinally extending nylon elements (middle ply) and an elastomer coating on each side (inner and outer plies). The nylon elements are pictured to be monofilaments.

SUMMARY OF THE INVENTION

Accordingly, it is an object of the present invention to provide a new and improved hose for conveying refrigerant fluids in an automotive air conditioning system, which remedies the shortcomings of the prior art as above discussed.

Another object of the invention is to provide a new and improved composite hose particularly suitable for conveying "Refrigerant 12", and which minimizes permeation of "Refrigerant 12".

Yet another object of the invention is to provide a new and improved composite automotive air conditioning system hose which also substantially prevents water ingression that otherwise would degrade the refrigerant and/or make the refrigerant chemically active, thereby to assure efficient performance of the air conditioning system and to avoid deterioration of other parts of this system.

A further object of this invention is to provide a composite hose as above noted which can intimately fit upon the stem (nipple/insert) of hose fittings and thereby preclude loss of refrigerant at the hose-hose fitting interface.

Another object of this invention is to provide a new and improved hose assembly including the hose of the invention and suitable hose fittings.

These and other objects are achieved according to the invention by providing a new and improved composite hose for conveying fluorocarbon-based, particularly "Refrigerant 12"-based, refrigerant fluids in an automotive air conditioning system, including an innermost three-ply composite tube. Each of the three plies of the tube is designed for a specific function.

The three-ply tube inner ply is a heat setting elastomer compound designed and selected to be in contact with and resist deterioration by the refrigerant fluid, to resist deterioration from the elevated temperatures in the system, to insulate the middle ply and to maintain intimacy with the hose fittings in order to minimize or prevent escape of refrigerant liquid at the interface.

The three-ply tube middle ply is a thermoplastic polymer designed and selected specifically to minimize permeation of the refrigerant fluid from the system to the atmosphere.

The three-ply tube outer ply is a heat setting elastomer compound which minimizes the ingression of water vapor from the atmosphere into and through the middle and inner tube plies into the refrigerant fluid in the system.

All three plies of the innermost element, i.e., three-ply tube, of the present invention are formed by concentric cylindrical extrusions of the respective materials. The three plies are bonded to each other by adhesives applied between the inner and middle plies and between the middle and outer plies.

Surrounding the innermost three-ply tube is a textile fiber yarn, cord or fabric reinforcement ply or plies designed and selected to perform efficiently in the dynamic pressure conditions inherent in the automotive air conditioning systems.

Depending on the character of the textile fiber and the adjacent elements, tube and cover, an adhesive may be applied to the textile fiber to facilitate bonding between the elements, this to provide an improved and efficient hose structure for use in the automotive air conditioning system.

The cover is a heat setting elastomer compound designed and selected to resist the deteriorating effects of the recognized severe environment in the underhood area of an automotive vehicle, to insulate the reinforcement from those deteriorating effects and to contribute to minimizing the ingression of water vapor through the underlying elements into the refrigerant system.

The hose assembly of the invention includes the above described hose and hose fitting of known character in use in automotive air conditioning systems.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein:

FIG. 2a is a view illustrating a hose assembly formed of the hose of the present invention with attached fittings; and FIG. 2b is an enlarged fragmentary cross-sectional view of the hose according to this invention.

DESCRIPTION OF THE PREFERRED EMBODIMENTS

Figure 1:
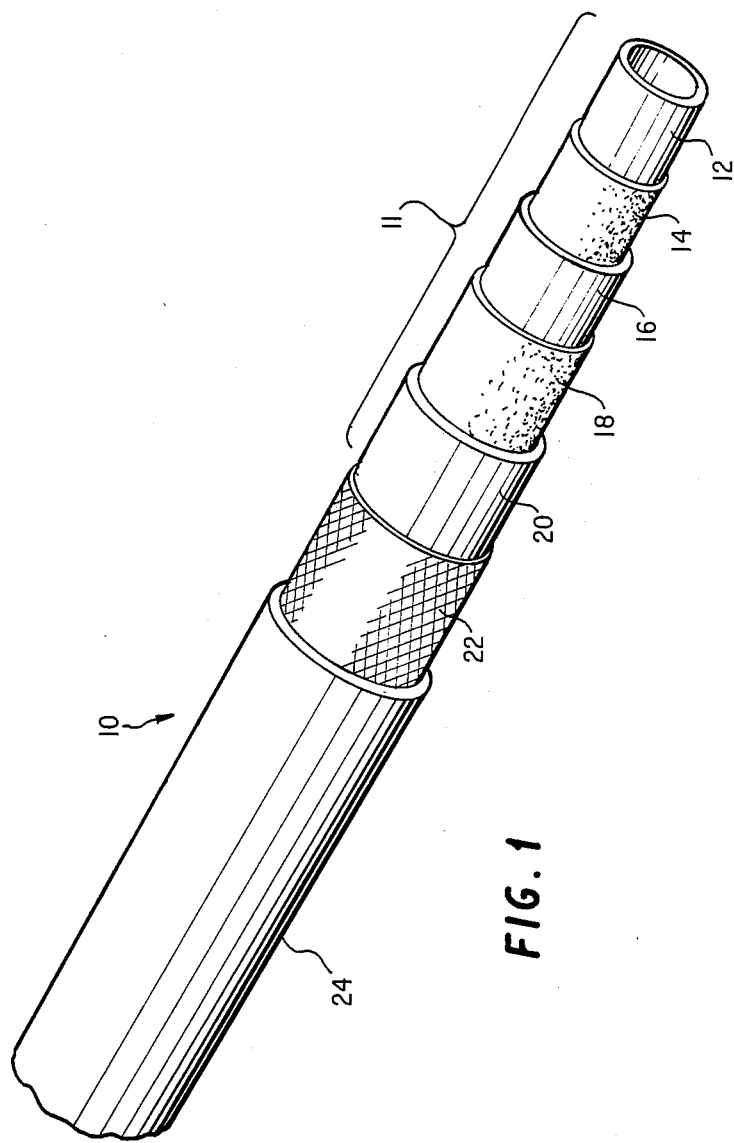
FIG. 1 is a perspective cutaway view of the hose of the invention.

Referring now to the drawings, wherein like reference numerals indicate identical or corresponding parts, in FIG. 1 the hose 10 of the invention includes an innermost three ply tube 11 formed of an elastomeric compound tube inner ply 12 which is extruded in a conventional manner over a mandrel (not shown). In an embodiment actually constructed a coating 14 of an adhesive is used to bond the inner ply 12 to a middle ply 16. The coating 14 is applied by dipping followed by wiping or otherwise by spraying to obtain a thin but uniform adhesive coating on the inner ply 12. The middle ply 16 is formed of a thermoplastic polymer which is extruded over the inner ply 12. In the constructed embodiment, an adhesive coating 18 is used to bond the tube middle ply 16 to an outer tube ply 20. Coating 18 is applied to the middle ply 16 by dipping followed by wiping or by spraying etc. The outer ply 20 is extruded over the middle ply 16 and the adhesive coating 18. Surrounding and reinforcing the innermost three-ply tube 11 is one or more textile reinforcement ply or plies 22 formed of either synthetic fiber or rayon yarn or cord applied by braiding or helical winding (aka spiralling), or of synthetic fiber or rayon fiber applied by wrapping. The yarn, cord or fabric of the reinforcement ply or plies 22 may be precoated with a suitable adhesive or may be coated with an adhesive in an intermediate operation to provide a bond between the reinforcement ply 22 and the outer ply 20 of the three-ply tube 11 and between the reinforcement ply 22 and an outer cover 24. The outer cover 24 is formed of an elastomeric compound layer extruded onto the reinforcing layer 22.

After fabrication of the compound hose structure, the hose structure is subjected to vulcanization, i.e. curing, to enable the elastomeric compound constituents to achieve their desired properties and to activate the adhesive constituents thereby to result in an integrated composite structure which performs in a superior manner in the service intended.

A heat setting elastomeric compound is selected for the inner ply 12 of the three-ply tube 11 in order to resist deterioration by the fluorocarbon-based refrigerant fluids, particularly dichlorodifluoromethane ("Refrigerant 12"), and any accompanying lubricating oil typically used in automotive air conditioning systems, as well as to resist deterioration in the elevated operating temperatures in the system and to maintain intimacy with the hose fittings used in conjunction therewith, thereby to prevent escape of refrigerant fluid, and to minimize the possibility for separation of the hose fittings resulting from the application of axial forces.

The middle ply 16 of the innermost tube 11 is formed of a thermoplastic polymer which is specifically selected to minimize permeation of refrigerant, i.e. particularly "Refrigerant 12", from the system to atmosphere. A heat set elastomeric compound is selected for the outer ply 20 of the three-ply tube 11. The specific material for ply 20 is selected in accordance with the required characteristics the hose is to have, such as for example a material which minimizes the ingression of water vapor from the atmosphere.

The textile fiber yarn, cord or fabric reinforcement ply or plies 22 is provided to enable the hose to accommodate dynamic pressure conditions inherent in an automotive air conditioning system, particularly one using "Refrigerant 12" as the fluorocarbon-based refrigerant.

A heat setting elastomeric compound is selected for the exterior cover 24 specifically in order to resist deterioration by the environment of the automotive engine compartment, to insulate and protect the adjacent reinforcement ply or plies 22, and to contribute to the minimization of ingression of water vapor from the atmosphere into the refrigerant system.

Specific examples of hoses constructed according to the invention are illustrated in the following Table 1:

TABLE 1

| Hose Element | Example 1 | Example 2 |
|---|---|---|
| inner ply 12 | NBR | NBR |
| adhesive 14 | Chemlok-Ty Ply Bn | Chemlok-Ty Ply BN |
| middle ply 16 | Nylon 6 | Nylon 6 |
| adhesive 18 | Chemlok-Ty Ply Bn | Chemlok 234 BE |
| outer ply 20 | NBR | BIIR |
| reinforcement ply 22 | braided polyester textile | braided polyester textile |
| adhesive | (none) | Chemlok 234 BE |
| cover 24 | CR | BIIR |

NBR = acrylonitrile-butadiene rubber
BIIR = bromo-isobutene-isoprene rubber
CR = chloroprene rubber The hose of example 2 exhibited reduced water ingression due to the selection of BIIR as the material of the outer ply 20 and cover 24.

A compound of NBR (a copolymer of acrylonitrile and butadiene (aka nitrile rubber)) or of CSM (chlorosulfonyl polyethylene) is preferred for the inner tube ply 12 because of their ability to resist deterioration in the presence of "Refrigerant 12" and the lubricating oil used in automotive air conditioning system fluids. Furthermore the ability of such compounds to maintain a seal at the interface with hose fitting stems is significant to the present invention.

A preferred adhesive for the layer 14 is an elastomer bonding agent such as, for example, sold by Lord Corp., Chemical Products Group, in its "Chemlok" series of adhesives.

Preferred polyamides (nylons) thermoplastic polymers for the tube middle ply 16 are sold under the designations of modified nylon 6, nylon 6/6, nylon 6/12, nylon 11 and nylon 12.

A preferred adhesive for the layer 18 also is an elastomer bonding agent. Lord Corp.'s "Chemlok" TyPly BN and "Chemlok" 234 BE adhesives have been successfully used as indicated in the above examples.

A compound of halogenated isobuteneisoprene rubber, such as BIIR, is preferred for outer ply 20 of the three-ply tube 11. Alternatively, the outer ply 20 can be a compound of PDM rubber (ethylene-propylene-diene monomer terpolymer). The preferred material for the reinforcement ply 22 is continuous filament polyester yarn or cord.

A compound of either EPDM rubber, chloroprene rubber or halogenated isobutene-isoprene rubber, such as BIIR, is preferred for the cover 24.

The preferred embodiment of the hose of the invention has dimensions as follows: the thickness of the three-ply tube inner ply 12 is between 0.02 inch (0.508 mm) and 0.10 inch (2.54 mm); the thickness of the three-ply tube middle ply 16 is between 0.005 inch (0.127 mm) and 0.025 inch (0.635 mm); the thickness of the three-ply tube outer ply 20 is between 0.02 inch (0.508 mm) and 0.10 inch (2.54 mm) and the thickness of the cover 24 is between 0.02 inch (0.508 mm) and 0.10 inch (2.54 mm).

The hose of the invention as above-described is suitable for use with a wide variety of conventional hose fittings presently commercially available, whereby a reliable hose-hose fitting interface can be obtained to provide a superior hose assembly. For example, the hose fitting 26 shown in FIG. 2a is of conventional design and consists of a typical tube-O seal, threaded swivel nut coupling 28 mounted on one end of a metal insert tube 30 having a bead 32 on which is disposed an o-ring 34. The metal tube 30 has a smooth stem secured to one end of the hose 10 by a crimped, bead locked shell 36, with the hose 10 crimped between the shell 36 and the insert tube 30. As also shown in FIG. 2a, at the other end of the hose 10 is a hose fitting 38, also conventional, consisting of a typical flanged fitting 40 with o-ring 42 having a grooved stem 44 secured to the hose 10 by means of a crimped, groove locked shell 46. The hose fittings 26 and 38 are well known, and other hose fittings can also be used with the hose of this invention. FIG. 2b shows the cross-section of the hose 10 shown in FIGS. 1 and 2a.

Obviously, numerous modifications and variations of the present invention are possible in light of the above teachings. For example, although the above examples describe the hose of the invention as made of specific materials, where the hose is intended for a different application and/or has different requirements, the hose may be tailored to the specific application or requirement by selecting different materials having the requisite properties for one or more of the elements of the hose. Different adhesives may then also be necessary, so long as the plies 12, 16, 20 are bonded together. Also, it is conceivable that it may be possible to select materials for the plies 12, 16, 20 which bond to each other during the manufacturing process without the need for adhesive layers 14, 18. In such an instance, adhesive layers 14, 18 can be omitted. It is therefore to be understood that within the scope of the appended claims, the invention may be practiced otherwise than as specifically described herein.

What is claimed as new and desired to be secured by Letters Patent of the United States is:

1. A composite hose for conveying refrigerant fluids and lubricating fluids in automotive air conditioning systems, comprising:
   an innermost three-ply tube adapted to be in direct communication with said refrigerant fluids;
   a textile fiber reinforcing layer surrounding said three-ply tube; and
   a cover surrounding said reinforcing layer;
   wherein the three-ply tube comprises,
   an inner ply of an elastomer compound,
   a middle ply of a thermoplastic polymer bonded to the inner ply, and
   an outer ply of an elastomer compound bonded to the middle ply, and
   first and second adhesive layers respectively provided between said inner and middle plies and said middle and outer plies of said three-ply tube to bond the three plies of the three-ply tube together;
   said inner ply of the three-ply tube being an elastomer compound selected from the group consisting of nitrile-butadiene rubber (NBR), chloro-sulfonyl-polyethylene rubber (CSM), chloroprene rubber (CR), epichlorohydrin polymer (CO), epichlorohydrin copolymer (ECO), and chloropolyethylene (CM);

said middle ply of the three-ply tube comprising a thermoplastic polyamide polymer; and said outer ply of the three-ply tube being an elastomer compound selected from the group consisting of chloroprene rubber (CR), chloro-sulfonyl-polyethylene rubber (CSM), ethylenepropylene copolymer (EPM), ethylene-propylene-diene terpolymer (EPDM), isobutene-isoprene rubber (IIR), bromo-isobutene-isoprene rubber (BIIR), chloroisobutene-isoprene rubber (CIIR), and chloropolyethylene (CM).

2. A hose as in claim 1, wherein the reinforcing layer comprises fibers made of a material selected from the group consisting of polyester, polyamide, rayon and aramid.

3. A hose as in claim 2, wherein the fibers of the reinforcing layer comprises an adhesive coating applied to individual fibers to enhance adherence to the three-ply tube and cover.

4. A hose as in claim 1, wherein the cover material is an elastomeric compound selected from the group consisting of chloroprene rubber (CR), epichlorohydrin hydrin polymer (CO), epichlorohydrin copolymer (ECO), chloro-sulfonyl-polyethylene (CSM), chloro-polyethylene (CM), ethylene-propylene copolymer (EPM), ethylene-propylene-diene terpolymer (EPDM), isobutene-isoprene rubber (IIR), bromo-isobutene-isoprene rubber (BIIR), and chloro-isobutene-isoprene rubber (CIIR).

5. A hose as in claim 1, further comprising:
adhesive layers applied beneath and over the reinforcing layer to provide bonding of said cover and said three-ply tube to said reinforcing layer.

6. A hose as in claim 1, wherein said reinforcing layer comprises:
plural textile reinforcing plies overlapping each other, and
adhesive layers applied between the plies of said reinforcing layer to bond said plies of said reinforcing layer together.

7. A hose as in claim 1, wherein the thickness of the three-ply tube inner ply is between 0.02 inch (0.508 mm) and 0.10 inch (2.54 mm); the thickness of the three-ply tube middle ply is between 0.005 inch (0.127 mm) and 0.025 inch (0.635 mm); the thickness of the three-ply tube outer ply is between 0.02 (0.508 mm) inch and 0.10 inch (2.54 mm), and the thickness of the cover is between 0.02 inch (0.508 mm) and 0.10 inch (2.54 mm).

8. A hose as in claim 7, further comprising:
adhesive layers applied beneath and over the reinforcing layer to provide bonding of said cover and said three-ply tube to said reinforcing layer.

9. A hose as in claim 8, wherein said reinforcing layer comprises:
plural textile reinforcing plies overlapping each other, and
adhesive layers applied between the plies of said reinforcing layer to bond said plies of said reinforcing layer together.

10. A hose assembly for conveying refrigerant fluids and lubricating fluids, in an automotive air conditioning systems, said hose assembly comprising:
a composite hose having opposed ends and comprising an innermost three-ply tube adapted to be in communication with said refrigerant fluids, a textile reinforcing layer surrounding said three-ply tube, and an outermost cover surrounding said reinforcing layer; and
a hose fitting attached to one end of the composite hose;
wherein said three-ply tube of said composite hose comprises,
an inner ply of an elastomer compound, a middle ply of a thermoplastic polymer bonded to the inner ply,
an outer ply of an elastomer compound bonded to the middle ply, and
first and second adhesive layers respectively provided between the inner and middle plies and the middle and outer plies of said three-ply tube to bond the three plies of said three-ply tube together;
said inner ply of the three-ply tube being an elastomer compound selected from the group consisting of nitrile-butadiene rubber (NMR), chloro-sulfonyl-polyethylene rubber (CSM), chloroprene rubber (CR), epichlorohydrin polymer (CO), epichorohydrin copolymer (ECO), and chloro-polyethylene (CM);
the middle ply of the three-ply tube comprising a thermoplastic polyamide polymer; and
the outer ply of the three-ply tube being an elastomer compound selected from the group consisting of chloroprene rubber (CR), chloro-sulfonyl-polyethylene rubber (CSM), ethylene-propylene copolymer (EPM), ethylene-propylene-diene terpolymer (EPDM), isobutene-isoprene rubber (IIR), bromo-isobutene-isoprene rubber (BIIR), chloro-isobutene-isoprene rubber (CIIR), and chloro-polyethylene (CM).

11. A hose assembly according to claim 10, wherein the reinforcing layer comprises fibers made of a material selected from the group consisting of polyester, polyamide, rayon and aramid.

12. A hose assembly according to claim 11, wherein the fibers of the reinforcing layer comprise an adhesive coating applied to individual fibers to enhance adherence to the adjacent three-ply tube and cover.

13. A hose assembly according to claim 11, wherein the cover material is an elastomeric compound selected from the group consisting of chloroprene rubber (CR), epichlorohydrin polymer (CO), epichlorohydrin copolymer (ECO), chloro-sulfonyl-polyethylene (CSM), chloro-polyethylene (CM), ethylene-propylene copolymer (EPM), ethylene-propylene-diene terpolymer (EPDM), isobutene-isoprene rubber (IIR), bromo-isobutene-isoprene rubber (BIIR), and chloro-isobutene-isoprene rubber (CIIR).

14. A hose assembly according to claim 13, further comprising:
adhesive layers applied beneath and over the reinforcing layer to provide bonding of said cover and said three-ply tube to said reinforcing layer.

15. A hose assembly according to claim 13, wherein said reinforcing layer comprises:
plural textile reinforcing plies overlapping each other, and:
adhesive layers applied between the plies of said reinforcing layer to bond said plies of said reinforcing layer together.

16. A hose assembly according to claim 15, wherein the thickness of the three-ply tube inner ply is between 0.02 inch (0.508 mm) and 0.10 inch (2.54 mm); the thickness of the three-ply tube middle ply is between 0.005 inch (0.127 mm) and 0.025 inch (0.635 mm); the thickness of the three-ply tube outer ply is between 0.02 inch (0.508 mm) and 0.10 inch (2.54 mm); and the thickness of the cover is between 0.02 inch (0.508 mm) and 0.10 inch (2.54 mm).

17. A hose assembly according to claim 10, comprising:
a hose fitting attached to the other end of said hose.

* * * * *